(12) United States Patent
Volke

(10) Patent No.: US 12,233,394 B2
(45) Date of Patent: Feb. 25, 2025

(54) METHOD AND FLUIDIZED BED GRANULATOR FOR THE PRODUCTION OF GRANULES FROM A SLURRY

(71) Applicant: YARA INTERNATIONAL ASA, Oslo (NO)

(72) Inventor: Howard Volke, Axel (NL)

(73) Assignee: YARA INTERNATIONAL ASA, Oslo (NO)

( * ) Notice: Subject to any disclaimer, the term of this patent is extended or adjusted under 35 U.S.C. 154(b) by 1025 days.

(21) Appl. No.: 17/271,317

(22) PCT Filed: Oct. 18, 2019

(86) PCT No.: PCT/EP2019/078314
§ 371 (c)(1),
(2) Date: Feb. 25, 2021

(87) PCT Pub. No.: WO2020/079204
PCT Pub. Date: Apr. 23, 2020

(65) Prior Publication Data
US 2021/0187461 A1  Jun. 24, 2021

(30) Foreign Application Priority Data

Oct. 18, 2018  (EP) ..................................... 18201327

(51) Int. Cl.
*B01J 2/16*  (2006.01)
*C05B 3/00*  (2006.01)
(Continued)

(52) U.S. Cl.
CPC ........ *B01J 2/16* (2013.01); *C05B 3/00* (2013.01); *C05B 7/00* (2013.01); *C05B 19/00* (2013.01); *C05C 9/00* (2013.01)

(58) Field of Classification Search
CPC .............. B01J 2/16; C05B 19/00; C05C 9/00
See application file for complete search history.

(56) References Cited

U.S. PATENT DOCUMENTS

| 5,964,901 A | 10/1999 | Kido |
| 6,203,730 B1 * | 3/2001 | Honda ....................... B01J 2/16 |
| | | 264/117 |
| 2013/0319060 A1 * | 12/2013 | Niehues .................. C05C 9/005 |
| | | 71/28 |

FOREIGN PATENT DOCUMENTS

| CN | 1741844 A | 3/2006 |
| CN | 101984748 A | 3/2011 |

(Continued)

OTHER PUBLICATIONS

Russian Office Action (including English translation) issued in App. No. RU2021111573, dated Feb. 3, 2023, 10 pages.
(Continued)

*Primary Examiner* — Daniel Berns
*Assistant Examiner* — Eric Scott Sherman
(74) *Attorney, Agent, or Firm* — Dilworth IP, LLC

(57) ABSTRACT

A method for granulating a slurry in a fluidized bed granulator having a main longitudinal direction from a seed end where granulation is initiated, to a product discharge end where granules are discharged from the fluidized bed granulator, including at least one fluidized bed compartment, an injection section and a granulation section, separated by a bottom plate including one or more injection nozzles, wherein a feed slurry is provided to the injection section, wherein a first fraction of the feed slurry provided to the injection section is injected into the granulation section through the one or more injection nozzles and a second fraction of the feed slurry, being the remainder of the feed slurry, is passed through the injection section without being injected into the granulation section. A fluidized bed granulator for the granulation of slurries for fertilizer products such as UAS according to the method of the invention.

14 Claims, 4 Drawing Sheets

(51) Int. Cl.
*C05B 7/00* (2006.01)
*C05B 19/00* (2006.01)
*C05C 9/00* (2006.01)

(56) References Cited

FOREIGN PATENT DOCUMENTS

| | | | |
|---|---|---|---|
| CN | 103384560 A | | 11/2013 |
| CN | 103951508 A | | 7/2014 |
| JP | 62160124 | | 7/1987 |
| JP | S62160124 | * 7/1987 | ............... A61J 3/06 |
| JP | 1278727 | | 11/1989 |
| JP | 2005342678 | | 12/2005 |
| RU | 2410153 C1 | | 1/2011 |
| WO | 2012034650 | | 3/2012 |
| WO | 2017007315 A1 | | 1/2017 |
| WO | 2019215193 | | 11/2019 |

OTHER PUBLICATIONS

International Search Report and Written Opinion issued in International Application No. PCT/EP2019/078314, Mailed Jan. 2, 2020, 12 pages.
Notification of Transmittal of the International Preliminary Report on Patentability and IPRP in International Application No. PCT/EP2019/078314, Issued Dec. 23, 2020, 14 pages.
Second Written Opinion of the International Preliminary Examing Authority in International Application No. PCT/EP2019/078314, Issued Jul. 20, 2020, 7 pages.
Chinese Office Action (with English translation) issued in App. No. CN201980068546.1, dated May 16, 2022, 24 pages.

\* cited by examiner

METHOD AND FLUIDIZED BED GRANULATOR FOR THE PRODUCTION OF GRANULES FROM A SLURRY

TECHNICAL FIELD

The invention relates to a method and a fluidized bed granulator for the production of granules from a slurry. The invention particularly pertains to fertilizer granules, most particularly to urea ammonium sulfate (UAS) granules.

BACKGROUND

Urea granules are typically produced in a fluidized bed granulator, wherein particles are formed while being kept in motion by an air stream. Liquid urea is sprayed onto these particles in the form of droplets or as a film, thereby causing particle growth. The resulting granulate has excellent strength, allowing it to be transported by ship or over land over large distances. Ammonium sulfate is a salt which is generally produced by reacting ammonia with sulfuric acid. The resulting solution is concentrated and converted into solid particles or a slurry. Ammonium sulfate (AS) is soluble in a urea melt up to a concentration of about 12 weight % and forms a homogeneous urea-ammonium sulfate (UAS) liquid, also called UAS-melt. This homogeneous liquid can be processed in a fluidized bed granulator in essentially the same way as a standard urea solution.

In practice, however, it is also desired to produce UAS having a substantially higher content of ammonium sulfate, particularly of over 12 weight %. This implies that UAS is to be produced wherein the concentration of ammonia sulfate would exceed the maximum soluble concentration. The production of UAS granules having such high concentrations of AS, typically greater than 12 weight %, is technically challenging due to the formation of solid AS particles in the urea melt, thus forming a slurry.

The slurry with an increased solid content will also lead to an increased tendency for fouling, scaling and sedimentation as product build up at the inner walls of all process-equipment in the granulation process. This fouling will lead to an increased risk of choking or blocking and hence an increased necessity of cleaning, etc. This will lead to an increase of down time of a granulation plant. The fouling also increases the pressure drop over the equipment, increasing operational costs.

The inventors have now found a method for granulating a slurry in a fluidized bed granulator that overcomes the cited disadvantages.

PRIOR ART

WO2012/034650 (Uhde Fertilizer Technology B. V., 2012) discloses a method for recycling ammonium salts, obtained from a scrubbing system for the removal of ammonia from the off-gas of a urea granulator, by mixing these salts homogeneously in a urea granulator with urea. Both a urea/ammonium salt stream and a urea solution are inserted into a granulator. Thereby, the amount of urea/ammonium salt is the highest in the first compartment of the granulator, and decreases in downstream direction along the axis of the granulator. The highest amount of the urea solution is sprayed into the granulator at the granule flow outlet side, and the amount of urea solution is decreased in upstream direction along the axis of the granulator. The amount of ammonia salt in the stream is lower than 12 weight %. This method does not prevent scaling or sedimentation in the feed lines comprising urea with an insoluble amount of salt such as AS.

WO 2017/007315 (Stamicarbon B.V., 2017) discloses a method for producing UAS granules with an AS concentration greater than 12 weight %. This method produces heterogeneous granules comprising a core with a high AS content and an outer layer with low AS content. This method does not prevent scaling or sedimentation in the feed lines comprising urea with an insoluble amount of salt such as AS.

JP62160124 (Toyo, 1987) describes a device for spraying a liquid, comprising a nozzle for spraying the liquid supplied by a supply pipe. The nozzle is also supplied with air to spray the liquid and the supply pipe ensures that the liquid goes back instantly to the liquid tank when the air supply is cut and prevents any liquid dripping. The liquid does not go back to the liquid tank while the air supply is on to the nozzles and the spraying process is ongoing.

JP2005342678 (SS Pharmaceut, 2005) describes an apparatus for spraying a liquid on tablets. The apparatus comprises nozzles fed by a pipe circulation system which comprises a feed line and a return line. The return line reduces the leakage of coating liquid into the coating pan when the nozzles are not open. The apparatus is designed to spray liquids and is silent on spraying slurries. Hence, the problem for clogging of the lines is not disclosed.

SUMMARY OF THE INVENTION

In the first aspect, the invention relates to a method for granulating a slurry in a fluidized bed granulator having a main longitudinal direction from a seed end where granulation is initiated, to a product discharge end where granules are discharged from the fluidized bed granulator, comprising at least one fluidized bed compartment, an injection section and a granulation section, separated by a bottom plate comprising one or more injection nozzles, wherein a feed slurry is provided to the injection section of the fluidized bed granulator, wherein a first fraction of the feed slurry provided to the injection section is injected into the granulation section through the one or more injection nozzles and a second fraction of the feed slurry, being the remainder of the feed slurry, is passed through the injection section without being injected into the granulation section.

As for the method of the first aspect, passing a fraction of the feed slurry through the injection section ensures that the feed slurry remains in motion along the injection section, particularly along the injection nozzles where the temperature tends to drop and the solubility decreases. A slurry moving through the injection section will lead to less or no sedimentation as solids are entailed by the liquid matrix, which reduces sedimentation. Reducing the buildup of product along the inner walls of feed and transport piping and equipment reduces the pressure drop over the equipment. This reduces operational costs. Furthermore, this has a positive impact on product consistency, as the process becomes easier to control with less variable process parameters such as the pressure drop over the equipment.

Reducing the buildup of product reduces the downtime of the fluidized bed granulator and the corresponding plant in which such fluidized bed granulator is incorporated, for cleaning purposes. The buildup of product can also lead to the blocking of individual feed and transport lines or equipment, which reduces the throughput of the fluidized bed granulator and the product quality. By reducing the buildup of product, product throughput and quality remains consistent for longer operational time of the fluidized bed granulator and the corresponding plant in which such fluidized bed granulator is incorporated.

According to a second aspect, the invention relates to a fluidized bed granulator (40) having a main longitudinal direction from a seed end where granulation is initiated, to a product discharge end where granules are discharged from the fluidized bed granulator (40), comprising at least one fluidized bed compartment (45, 45', 45"), an injection section (42a-42f) and a granulation section, separated by a bottom plate comprising one or more injection nozzles, feeding means of the granulation material, comprising at least a main feed line (31) and one or more injection feed lines (41a-41f) taken from the main feed line (31), each fluidly connected to the one or more injection nozzles, wherein one or more exit lines (51, 52) are fluidly connected to an injection feed line (41a-41f) downstream of the one or more injection nozzles.

The fluidized bed granulator according to the second aspect has a higher uptime, as it requires less frequent cleaning, when used for granulation of slurries. The fluidized bed granulator is suited and advantageous for slurries, but can also be used for liquids and dispersions.

According to a third aspect, the invention relates to the use of the fluidized bed granulator for the granulation of a slurry, where the risk of sedimentation is greatly reduced.

In the fourth aspect, the invention relates to a method for reducing clogging of the injection section in a fluidized bed granulator comprising at least one fluidized bed compartment having a main longitudinal direction from a seed end where granulation is initiated, to a product discharge end where granules are discharged from the fluidized bed granulator, an injection section and a granulation section, separated by a bottom plate comprising one or more injection nozzles, wherein a feed slurry is provided to the injection section of the fluidized bed granulator, wherein a first fraction of the feed slurry provided to the injection section is injected into the granulation section through the one or more injection nozzles and a second fraction of the feed slurry, being the remainder of the feed slurry, is passed through the injection section without being injected into the granulation section. By only injecting a first fraction of the feed slurry and removing a second fraction of the feed slurry, the feed slurry does not stagnate around the injection nozzles. As a result, the clogging along the injection nozzles where sedimentation and clogging is most likely, is drastically reduced.

DETAILED DESCRIPTION OF THE INVENTION

Figure 1:
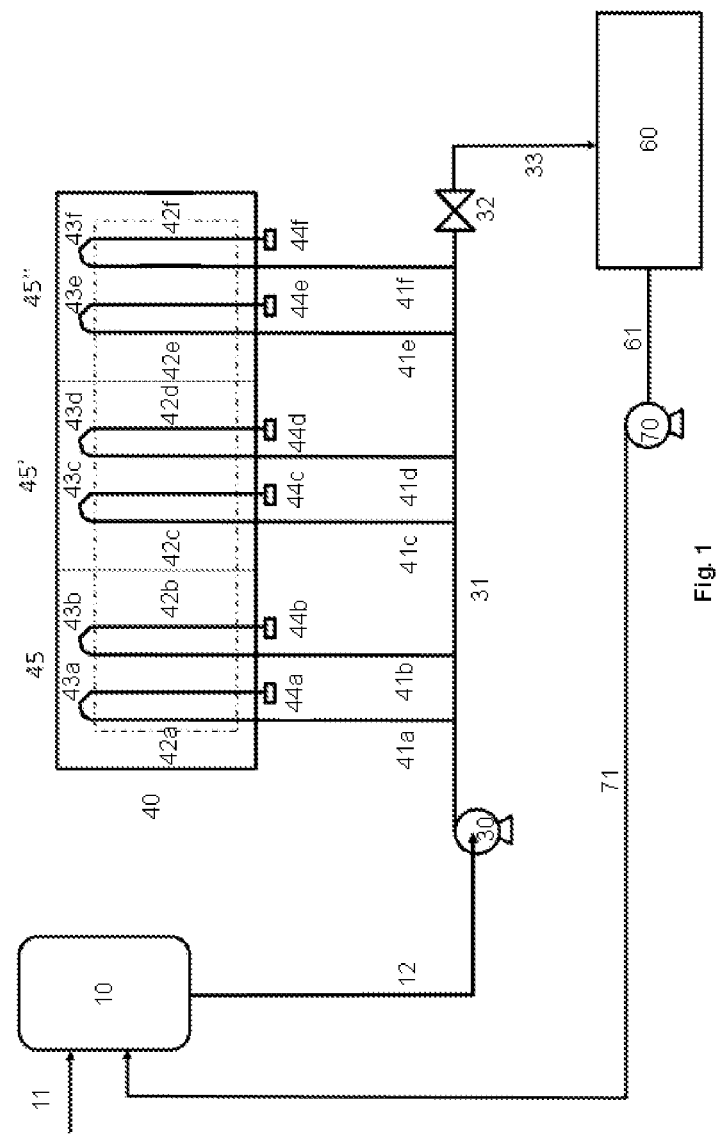
FIG. 1 shows a schematic overview of a plant for the fluidized bed granulation of urea solutions according to the prior art.

The present invention concerns a method for producing granules. More particularly, the invention relates to granules of fertilizer slurry. This slurry comprises a liquid component with insoluble solids therein. More particularly, the present invention relates to the granulation of urea slurries such as urea ammonium sulfate (UAS). The present invention also concerns a fluidized bed granulator for producing such granules from such fertilizer slurries.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints.

The expression "weight %", "weight percent", "% wt" or "weight %", here and throughout the description unless otherwise defined, refers to the relative weight of the respective component based on the overall weight of the formulation.

A "slurry" refers to a mixture comprising a main liquid component. In the spirit of the invention, the main liquid component will frequently be urea. However, other fertilizers such as ammonium nitrates or ammonium phosphates can also be used as main liquid component. The slurry further comprises an insoluble solid component. In the present invention, the insoluble component is preferably ammonium sulfate, but can also by any other constituent in an amount that is insoluble in the main liquid component. Other examples are salts such as phosphates, including calcium dihydrogen phosphate, dicalcium hydrogen phosphate, diammonium phosphate, mono-ammonium phosphate, potassium salts including potassium chloride, potassium nitrate and potassium phosphate, and sulfate salts such as ammonium sulfate. The insoluble component may be partly soluble in the main liquid component, so a slurry may comprise two components, the main liquid component and a second component, which is present in the liquid phase and as a solid. For example, in a urea melt comprising 20 weight % of ammonium sulfate, about 10 to about 15 weight % of ammonium sulfate may be dissolved in the melt, and about 5 to about 10 weight % is present in the slurry as solid particles. In particular, it may comprise particles with a diameter of at most 5 mm, in particular 2.5 mm. Particles with a diameter over 1 mm increase the risk of clogging the tubes and the nozzles, in particular because the typical orifice size of a nozzle ranges from about 0.5 to 5 mm. In particular, the slurry may comprise solid particles where 90% of the particles have a diameter below 125 µm. In one embodiment, 50% of the solid particles in the slurry have a diameter below 63 µm. In one embodiment, 50% of the solid particles have a diameter below 30 µm. Several methods are known in the art of chemical engineering to measure small particles, for example air jet sieve, laser diffraction. These methods are suitable to measure the particles used in this invention.

The solid particles of a slurry are entrained in the main liquid component of the slurry. Sedimentation refers to solid particles which settle by escaping this entrainment. Sedimentation leads to a very high concentration of solid particles along the bottom of the equipment. Fouling and scaling is the formation of a solid layer along the surface of piping and equipment which holds the slurry. Scaling leads to a relatively sturdy layer along the surface of the equipment, rather than individual solid particles.

In the first aspect, the invention relates to a method for granulating a slurry in a fluidized bed granulator comprising at least one fluidized bed compartment. The fluidized bed granulator has a main longitudinal direction from a seed end where granulation is initiated, to a product discharge end where granules are discharged from the fluidized bed granulator, an injection section and a granulation section separated by a bottom plate comprising at least one injection nozzle. The injection nozzle has a typical orifice size that ranges from about 0.5 to 5 mm, in particular is about 4.7 mm. A feed slurry is provided to the injection section of the fluidized bed granulator, such that a first fraction of the feed slurry provided to the injection section is injected into the granulation section through the injection nozzle and a second fraction of the feed slurry is removed from the injection section without passing through the bottom plate. The feed slurry has a typical particle size of least about 10 nm, in particular at most about 5 mm, in particular at most about 2.5 mm.

By injecting only a fraction of the provided feed slurry into the granulator, the remainder of the feed slurry flow is passed through the injection section. This leads to a steady flow of the slurry along the injection section rather than the slurry stagnating near the end caps of the injection feed lines. The stagnation quickly leads to sedimentation, which leads to further pressure increases at the end of the line as well as plugging. By replacing end caps with another line, through which a small fraction of the slurry is removed from the injection feed lines, the slurry maintains a predetermined minimum velocity within the injection section of the fluidized bed granulator.

The fraction of the feed slurry which is injected should be strictly less than 1. According to one embodiment, the fraction of the feed slurry which is injected (the first fraction) ranges between 70% and 99%, more preferably the fraction ranges between 80% and 95%, more preferably between 85% and 95% of the total feed slurry.

According to one embodiment, the feed slurry which is not injected is returned to a point upstream of the injection section. There, the returned feed slurry is mixed with fresh feed slurry. Returning the feed slurry ensures optimal use of all feedstock material. The feed slurry is preferably returned using a return line, which connects the outlet of an injection feed line to a point upstream of the injection section.

A "return" or "return line" as defined herein returns unprocessed slurry back to the feedstock. The slurry which is returned is not processed. It has roughly the same composition and properties as the feedstock. The return of feedstock is used to improve process quality or conditions.

This is unlike a "recycle" or "recycle line". In a recycle, off-spec products and byproducts are recycled to the feedstock. A recycle typically has a form of selection or separation, which determines and separates which products are on-spec and which are recycled. Recycles are used to increase the conversion towards high-value products. The recycled products have vastly different compositions and/or properties than the feedstock to which they are recycled.

"Upstream" refers to previous processes, and in this particular case upstream implies that, by following the order of processing, the material will reach the granulator again. This implies that upstream can be the evaporation unit, in which urea is condensed, a mixing tank, a holding tank, or other equipment as well as any line connecting these, as long as the returned slurry reaches the injection section again. "Downstream of a process unit" refers to all processes which are performed later than the process unit. For example, the drying section of the granulator, where the granules are dried, is downstream of the injection section of the granulator.

According to one embodiment, a predetermined minimum velocity of the feed slurry within the injection section is maintained.

According to another embodiment, a predetermined minimum velocity of the feed slurry in the return lines is maintained.

According to another embodiment, a predetermined minimum velocity in each line comprising the slurry is maintained.

The predetermined minimum velocity should be at least 0.1 m/s, preferably 0.3 m/s, more preferably 0.5 m/s, more preferably 0.7 m/s, more preferably 1.0 m/s, more preferably 1.5 m/s, more preferably 2.0 m/s. For high solid content, higher predetermined minimum velocity can be considered such as 2.5 m/s, preferably 3.0 m/s most preferably 5.0 m/s. Lower values have lower operating costs but a higher chance for sedimentation. If the velocity drops under 0.1 m/s, sedimentation and fouling becomes very prevalent. For slurries, achieving high minimum velocities such as those above 5.0 m/s can lead to high operating costs and be technically difficult to achieve. The minimum velocity reduces the buildup of product along the inner walls of the equipment, by avoiding stagnating slurry within the equipment. This is particularly important in the injection section, injection feed lines and return lines, where buildup of product leads to high operational costs and high risk for plugging or blocking.

According to one embodiment, the predetermined minimum velocity of the feed slurry within the injection section is at least 0.5 m/s, preferably higher than 1.0 m/s, more preferably higher than 2.0 m/s.

According to another embodiment of the invention, the fraction of the feed slurry which is returned (the second fraction) ranges between 1% and 30 weight %, preferably between 3% and 20%, more preferably between 5% and 15%, still more preferably between 7% and 13%, still more preferably between 8% and 12%, and most preferably about 10% of the total feed. Higher values lead to a high operational cost due to a large return stream and an large increase in feed-line throughput for a constant granulator throughput.

Lower values lead to a low or inconsistent minimum velocity within the equipment, leading to sedimentation and fouling.

According to one embodiment, the second fraction, after being passed through the injection section (45, 45', 45"), is mixed with the feed slurry and returned to the injection section (45, 45', 45"). Practically, the second fraction of feed slurry (returned feed slurry) is mixed in a container, such as a mixing drum. According to one embodiment, the feed slurry and the second fraction of feed slurry have more or less the same composition. Mixing feed and returned feed slurries leads to a more consistent feed slurry downstream of the mixing drum, such as in the injection section. Furthermore, it leads to more consistent physical properties such as temperature and solids content. This facilitates downstream processes such as the injection and granulation.

In a further embodiment, the mixing drum is downstream of the concentration or evaporation unit. In a further preferred embodiment, the mixing drum is downstream of the injection section. This reduces the amount of processing of the return stream, which reduces the throughput through these processes and related costs.

According to one embodiment, the slurry is returned continuously. That is to say, the second fraction of the feed slurry is continuously passed by the injection section. However, when using a pit tank or similar equipment, the discontinuous return of the second fraction of the feed slurry to a point upstream of the granulator is also possible.

The slurry according to the present invention can be any fertilizer composition. According to one embodiment, the liquid phase of the slurry is urea melt. According to one embodiment, the solid phase of the slurry is a compound suitable to allow a free choice in the ratio of plant nutrient elements, such as nitrogen, phosphorus, sulfur, potassium and the like. This can be done by the addition of nitrate, phosphate, sulfate and potassium salts. Alternatively, other compounds holding nutrients can be used, such as elemental sulfur. In a particularly preferred embodiment, ammonium sulfate (AS) is added to urea. Ammonium sulfate is more readily soluble in water, which makes the sulfur more accessible for plants. However, ammonium sulfate has limited solubility in urea. At common processing temperatures, the solubility limit of AS in urea is roughly 12% (w/w).

The invention will further be detailed for the example of urea ammonium sulfate (UAS) slurries. However, the invention can easily be used for any fertilizer slurry, particularly urea comprising one or several insoluble solids.

As in conventional urea or UAS granulation, the core of the granules is provided by seed particles onto which granulation liquid is applied. In the event of UAS, these seed particles are generally provided from powdered (typically coarse) urea or UAS granulate. Such powder can generally be obtained by suitable size reduction techniques such as crushing, grinding, milling, or other methods of pulverizing a granulate. The seeds can have a wide variety in composition. Particularly, they can originate from either or from granules with high AS-concentration or granules with low AS concentration. Preferably, the seed particles are provided by crushing the granulate produced according to the invention. Thereby the average AS-concentration in the seed-particles will generally be equal to the average AS-concentration in the granules produced in the fluidized bed granulator. It is, however, also possible (both as initial seed particles and throughout the process) to employ pure urea particles as seeds, or pure AS-particles, or particles recycled from the dust removal process associated with the granulation process. The foregoing correspondingly applies to salts other than AS, or to mixtures of salts.

In all of the foregoing, granulation liquids having more than a soluble amount of the salt, such as more than 12 weight % of AS, the urea comprising the dissolved amount of salt can be considered to be the continuous phase of the slurry. Hereby urea will generally be highly concentrated, in the sense that it is present as a urea liquid containing at most a small amount of water and dissolved salt, such as AS. Generally, the amount of water will not exceed 10 weight %. Preferably, the urea liquid comprises at least 95 weight % of urea and biuret, and more preferably at least 98.5 weight % of urea and biuret. As to biuret, this is a regular component of urea, resulting as a by-product of urea synthesis. For the typical use of urea products such as UAS, viz., as a fertilizer, the amount of biuret is not particularly critical, although generally below 5 weight % and preferably not exceeding 1 to 1.3 weight %. Preferably, the biuret content is at most 1 weight %, and for some application more preferably below 0.3 weight %.

The urea for use in the present invention can be produced in any manner. The skilled person is familiar with various processes that are available for the production of urea.

A frequently used process for the preparation of urea according to a stripping process is the carbon dioxide stripping process as, for example, described in Ullmann's Encyclopedia of Industrial Chemistry, Vol. A27, 1996, p 333-350. In this process, the synthesis section is followed by one or more recovery sections. The synthesis section comprises a reactor, a stripper, a condenser and a scrubber in which the operating pressure is in between 12 and 18 MPa and preferably in between 13 and 16 MPa. In the synthesis section, the urea solution leaving the urea reactor is fed to a stripper in which a large amount of non-converted ammonia and carbon dioxide is separated from the aqueous urea solution. Such a stripper can be a shell and tube heat exchanger in which the urea solution is fed to the top part at the tube side and a carbon dioxide feed to the synthesis is added to the bottom part of the stripper. At the shell side, steam is added to heat the solution. The urea solution leaves the heat exchanger at the bottom part, while the vapor phase leaves the stripper at the top part. The vapor leaving the stripper contains ammonia, carbon dioxide and a small amount of water. The vapor is condensed in a falling film type heat exchanger or a submerged type of condenser that can be a horizontal type or a vertical type. A horizontal type submerged heat exchanger is described in Ullmann's Encyclopedia of Industrial Chemistry, Vol. A27, 1996, pp 333-350. The heat released by the exothermic carbamate condensation reaction in the condenser is usually used to produce steam that is used in a downstream urea processing section for heating and concentrating the urea solution. Since a certain liquid residence time is created in a submerged type condenser, a part of the urea reaction takes already place in the condenser. The formed solution, containing condensed ammonia, carbon dioxide, water and urea together with the non-condensed ammonia, carbon dioxide and inert vapor is sent to the reactor. In the reactor the above mentioned reaction from carbamate to urea approaches the equilibrium. The ammonia to carbon dioxide molar ratio in the urea solution leaving the reactor is generally in between 2.5 and 4 mol/mol. It is also possible that the condenser and the reactor are combined in one piece of equipment. An example of this piece of equipment as described in Ullmann's Encyclopedia of Industrial Chemistry, Vol. A27, 1996, pp 333-350. The formed urea solution leaving the urea reactor is supplied to the stripper and the inert vapor containing non-condensed ammonia and carbon dioxide is sent to a scrubbing section operating at a similar pressure as the reactor. In that scrubbing section the ammonia and carbon dioxide is scrubbed from the inert vapor. The formed carbamate solution from the downstream recovery system is used as absorbent in that scrubbing section. The urea solution leaving the stripper in this synthesis section requires a urea concentration of at least 45 weight % and preferably at least 50 weight % to be treated in one single recovery system downstream the stripper. The recovery section comprises a heater, a liquid/gas separator and a condenser. The pressure in this recovery section is between 200 to 600 kPa. In the heater of the recovery section, the bulk of ammonia and carbon dioxide is separated from the urea and water phase by heating the urea solution. Usually, steam is used as heating agent. The urea and water phase contains a small amount of dissolved ammonia and carbon dioxide that leaves the recovery section and is sent to a downstream urea processing section where the urea solution is concentrated by evaporating the water from the solution.

The invention is not limited to any particular urea production process. Other processes may include those that are based on technology such as the HEC process developed by Urea Casale, the ACES process developed by Toyo Engineering Corporation and the process developed by Snamprogetti. All of these processes, and others, may be used preceding the urea finishing method of the invention.

Urea production generally involves a finishing step in which a urea melt is brought into the desired particulate form, generally involving any one of prilling, granulation, and pelletizing. For the production of UAS granulate according to the invention, either preformed solid urea can be remelted and subject to mixing with AS and granulation. Preferably, the mixing with AS is done with a urea melt directly obtained from a urea production plant, prior to finishing. A preferred urea finishing method, and preferably used in the present invention for granulation of urea products such as UAS as well, is fluidized bed granulation. Therein, a urea melt is sprayed on granules that grow in size as the process continues. The term "urea melt" is known in the art, and is applied to urea having less than 10 weight % of water, such as less than 5 weight % of water and preferably up to 1.5 weight % of water (and generally including biuret, as mentioned above). The concentration of urea usually takes place at high temperatures and sub-atmospheric pressures. Usually, concentration of the urea solution to the desired moisture content in the anhydrous urea melt takes place in a concentration section comprising one or a sequence of one or more concentrators in series.

Granulation is preferably conducted in a fluidized bed granulator. Such granulator typically comprises an inlet for seed particles, an outlet for granule products, a perforated bottom plate for distributing fluidizing air, and a gas outlet. In order to accommodate the process of the invention, a preferred granulator further comprises one or more compartments configured between the inlet for seed particles and outlet for granule products. Each compartment contains at least one or more nozzles, preferably a series of 30 or more nozzles, for spaying a slurry or a melt of urea, UAS, or another applicable urea product granulation liquid into the granulation section. Different types of nozzles can be employed. Particularly, one type generates droplets, another type serves to feed the slurry or the melt to the fluidized bed, maintained in the granulation section, in the form of a film. The granulator is configured to move the particles from its inlet to its outlet whereby the particle's size increases from the inlet to the outlet. In the process of the invention, the feed stream will be a slurry.

The slurry according to the invention has a concentration of AS greater than 12 weight %, preferably greater than 14 weight %, preferably greater than 16 weight %, more preferably greater than 18 weight %, more preferably greater than 20 weight %, more preferably greater than 22 weight % and most preferably greater than 25 weight %. The slurry has a concentration of AS smaller than 50 weight %, preferably smaller than 45 weight %, more preferably smaller than 40 weight %, most preferably smaller than 35 weight %.

It will be understood that, downstream of the final granulation compartment, a fluidized bed granulator according to the invention may comprise one or more additional compartments, not used for feeding granulation liquid. This typically includes a cooling compartment.

The ammonium sulfate (AS) can be from any source. In an interesting embodiment, the AS is formed by neutralizing ammonia obtained from urea finishing. In this respect, reference is made to US 2013/0319060. Another background reference on neutralizing $NH_3$ off-gas with sulfuric acid, followed by UAS formation, is US 2012/0240649. In another interesting embodiment, which is beneficial from an economical point of view, the AS is provided as a by-product or another process, such as from the production of caprolactam or from the desulfurization of coal. In conventional urea granulation processes, the off-gases and condensates from the urea-evaporation unit are transported to further processing steps (in the urea melt-plant), and need to be treated/reworked at great effort, and with a relatively high energy consumption. In connection with the present invention, the off-gases and condensates from the UAS-evaporation section containing a high amount of $NH_3$ are preferably transported to a dust- and $NH_3$-washing section. There, the $NH_3$ is simply neutralized so as to form AS, i.e., converted by reaction with sulfuric acid to ammonium sulfate.

It will be understood that, in the context of the invention's purpose to produce UAS, the choice to produce AS from ammonia obtained (such as by washing) from the evaporation-section is a very efficient use of the off-gases and condensates from the evaporation. This reduces the amount of AS that has to be added separately.

Any suitable type of fluidized bed granulator and fluidized bed granulation process can be used. As is known in the art, the granulation liquid can be applied in various ways. Generally, this liquid will be provided in the form of atomized droplets, or as a sprayed film. It will be understood that the granulation fluids are provided at a sufficiently high temperature to be actually in a liquid state. As is known in the art, for urea granulation the temperature of the granulation liquid is in a range of 132 to 140° C. Since presence of ammonium sulfate reduces the crystallization temperature of the granulation liquid, typical temperatures for UAS granulation of the granulation liquid are in a range of 118 to 140° C.

According to a second aspect, the invention relates to a fluidized bed granulator (40) having a main longitudinal direction from a seed end where granulation is initiated, to a product discharge end where granules are discharged from the fluidized bed granulator (40), comprising
  at least one fluidized bed compartment (45, 45', 45"),
  an injection section (42a-42f) and a granulation section, separated by a bottom plate comprising one or more injection nozzles,
  feeding means of the granulation material, comprising at least a main feed line (31) and one or more injection feed lines (41a-41f) taken from the main feed line (31), each fluidly connected to one or more injection nozzles, wherein one or more exit lines (51, 52) are fluidly connected to an injection feed line (41a-41f) downstream of the one or more injection nozzles.

The exit lines serve to pass a fraction of the feed past the injector nozzles. As a result, a minimum velocity within the injection feed lines and exit lines can be maintained.

According to one embodiment, the return lines connect the injection feed line outlet with a point upstream of the granulator. This is beneficial as the feed is assumed to be on-spec, and not granulating it is likely going to result in a loss of feedstock. Furthermore, returning the feedstock improves process stability.

In order to regulate the return fraction, a restriction orifice or valve can be used. According to an embodiment of the invention, the fluidized bed granulator further comprises a restriction orifice suitable for controlling the flow through the return line. The restriction orifice does not need to be on the return line, but can control the flow merely through pressure increase and decrease. According to one embodiment, the restriction orifice is located between the injector and the return line.

According to an embodiment of the invention, the return line comprises a main return line and a plurality of injection return lines flowing into the main return line. This improves process stability as a single line plugging is most likely in the injection feed lines and injection return lines. These are the smallest lines with a generally low feed velocity. Plugging of a single injection feed or injection return line will not drastically impact the pressure or flow through the main lines feed line or main return line, allowing the other injection feed and injection return lines to remain operational. Yet still, the pressure in these lines will slightly increase, which helps offset the effect of a single line plugging. This stabilizes the plant during operating.

In a further preferred embodiment, each injection return line comprises a restriction orifice or valve. This is advantageous to control each section and line of the fluidized bed granulator separately. The overall return flow can be controlled as the sum of the individual injection return lines.

In a further preferred embodiment, each injection feed line passes the bottom plate once. In another preferred embodiment, the injection feed line and injection return lines are substantially straight. Urea solution granulation typically uses injection lines with several passes underneath the bottom plate. For solutions, this is also advantageous. For slurries however, the bends lead to faster sedimentation and more difficult cleaning. A straight injection feed line and exit or return line reduces the risk of plugging. Furthermore, it can be cleaned more easily by flushing or purging. More injection feed lines and return lines for a same amount of nozzles are required compared to a setup with multiple passes, but the load in each injection feed and exit or return lines is reduced. The injection feed lines are preferably distributed along the longitudinal direction of the granulator. This allows modification of the nozzles and their operating conditions to optimize granule growth.

According to one embodiment, the exit line connects the injector outlet with a mixing drum. This exit line is more preferably a return line, wherein the mixing drum is suitable for mixing fresh and returned feed and for reintroducing it into the granulator.

According to another embodiment, the container to which the feed is returned is a concentration or evaporation unit. This avoids the buildup of water and volatiles due to the return stream. However, given the low content of volatiles and the small return stream, this is generally not required. Furthermore, it reduces the amount of process steps.

According to another embodiment, the container to which the feed is returned, is a pit tank. A pit tank is a tank suitable for collecting the feed of the process while the process undergoes maintenance or cleaning. Using a pit tank as container for the return stream generally leads to high operational costs compared to a mixing drum. However, it has a low fixed equipment cost. Furthermore, it allows for the adaptation of fluidized bed granulation processes for urea solutions according to the invention. These processes generally comprise a pit tank for required shutdowns and maintenance. As such, existing granulators can be improved according to the present invention. If the feed is a slurry, which stagnates for a significant period of time in a tank or container, mixing before returning the slurry to the feeding means to avoid sedimentation may be required.

According to one embodiment, the return lines can be employed for flushing out the sedimentation and scaling which has built up in the equipment during maintenance or cleaning. This results in easier and quicker cleaning, which reduces costs and granulator downtime.

According a third aspect, the invention relates to the use of the fluidized bed granulator for the granulation of a slurry, where the risk of sedimentation is greatly reduced.

The fluidized bed granulator according to the invention can be used for liquids, slurries and other mixtures such as dispersions. However, the advantages related to sedimentation occur when a fluid entrails particles prone to sedimentation.

According to one embodiment, the slurry comprises urea. In another preferred embodiment, the slurry comprises ammonium sulfate. In the most preferred embodiment, the slurry comprises urea ammonium sulfate (UAS).

The urea-based slurry comprising insoluble solid material is subsequently solidified into solid granulates by passing the slurry to the spraying means comprising at least one nozzle of the fluidized bed granulator. The nozzle can be any nozzle that is appropriate for the respective granulator. For example, good results were obtained with a UFT granulator equipped with BETE spiral-type atomization nozzles (BETE Fog Nozzle, Inc., Greenfield, USA) and/or with HFT-type atomization nozzles (EP 1701798 B1, 2005, Yara International ASA) at an operating pressure of about 0,5 bar and a flow rate of about 10 liters/min. Note that such nozzle is operated at a much lower pressure than the nozzles, disclosed in U.S. Pat. No. 4,330,319 (Cominco Ltd, 1982) which nozzles need a pressure drop of at least about 200 kPa (2 bar). The use of a lower pressure is an advantage as less energy is required for spraying the melt.

According to a fourth aspect, the invention relates to a method for reducing clogging of the injection section in a fluidized bed granulator comprising at least one fluidized bed compartment having a main longitudinal direction from a seed end where granulation is initiated, to a product discharge end where granules are discharged from the fluidized bed granulator, an injection section and a granulation section, separated by a bottom plate comprising one or more injection nozzles, wherein a feed slurry is provided to the injection section of the fluidized bed granulator, wherein a first fraction of the feed slurry provided to the injection section is injected into the granulation section through the one or more injection nozzles and a second fraction of the feed slurry, being the remainder of the feed slurry, is passed through the injection section without being injected into the granulation section. By only injecting a first fraction of the feed slurry and removing a second fraction of the feed slurry, the feed slurry does not stagnate around the injection nozzles. As a result, the clogging along the injection nozzles where sedimentation and clogging is most likely, is drastically reduced.

Existing fluidized bed granulators and methods can be adapted according to the method of the fourth aspect to allow to remove the second fraction of the feed slurry from the injection section. This drastically reduces clogging and sedimentation within the equipment.

The invention is further described by the following non-limiting examples which further illustrate the invention, and are not intended to, nor should they be interpreted to, limit the scope of the invention.

The present invention will be now described in more details, referring to examples that are not limitative.

EXPERIMENTAL

Example 1 (Prior Art)

A granulator feed system for urea melt, such as known from the prior art, is shown in FIG. 1. The urea granules are produced in a fluidized bed granulator 40. The urea melt is a homogeneous liquid comprising only soluble additives. A feed solution 11 comprising urea, water and soluble additives is fed to an evaporation unit 10. Herein, water is evaporated from the urea melt through evaporation. The remaining urea melt solution with soluble additives is fed to feed pump 30 through the feed pump line 12, which pumps the urea melt to the main injection feed line 31. The main injection feed line distributes the urea melt to one or more injection compartment 45, 45', 45" feed lines 41a-41f. Each injection compartment feed line feeds urea melt to a specific part of the injection section 42a-42f of the fluidized bed granulator. In these injection sections, the urea melt is injected into the fluidized bed granulator compartments 45, 45', 45" through injection plates. Each injection compartment feed line can make one or several passes through the injection section. In this example, bends 43a-43f lead to two passes through the injection compartments for each injection compartment feed line. At the end of the injection compartment feed line is an end cap 44a-44f. The main injection feed line 31 is connected to a pit tank 60 through the pit tank feed line 33. The pit tank feed line 33 is controlled by valve 32. The pit tank is used to empty the granulator feed system during shut down, for example for cleaning or maintenance. When the granulator is started up, pit tank pump 70 returns the contents of the pit tank to the evaporation unit 10 through the return lines 61 and 71. Due to urea being in the melt phase with only soluble additives, there is no sedimentation or scaling in the feed lines. For solutions, this granulator feed system is sufficient.

Example 2

Example 2 comprises the use of the granulator feed system for urea melt from Example 1 for a UAS slurry according to the invention. Upon addition of 12 weight % or more ammonium sulfate (AS) to the urea melt of Example 1, a slurry of insoluble AS particles dispersed in urea melt is formed. Granulation of the slurry rapidly leads to sedimentation and scaling in the lines, particularly near the end caps 44a-44f and along injection section 42a-42f. The sedimentation increases the pressure drop. When this pressure reaches the acceptable limit, the granulator feed system needs to be cleaned. This drastically reduces the granulator uptime. Due to the pressure drop increasing as the scaling and sedimentation in the pipes increases, the process is hard to control. This has a negative impact on the consistency of the granules shape and size.

Example 3

Figure 2:
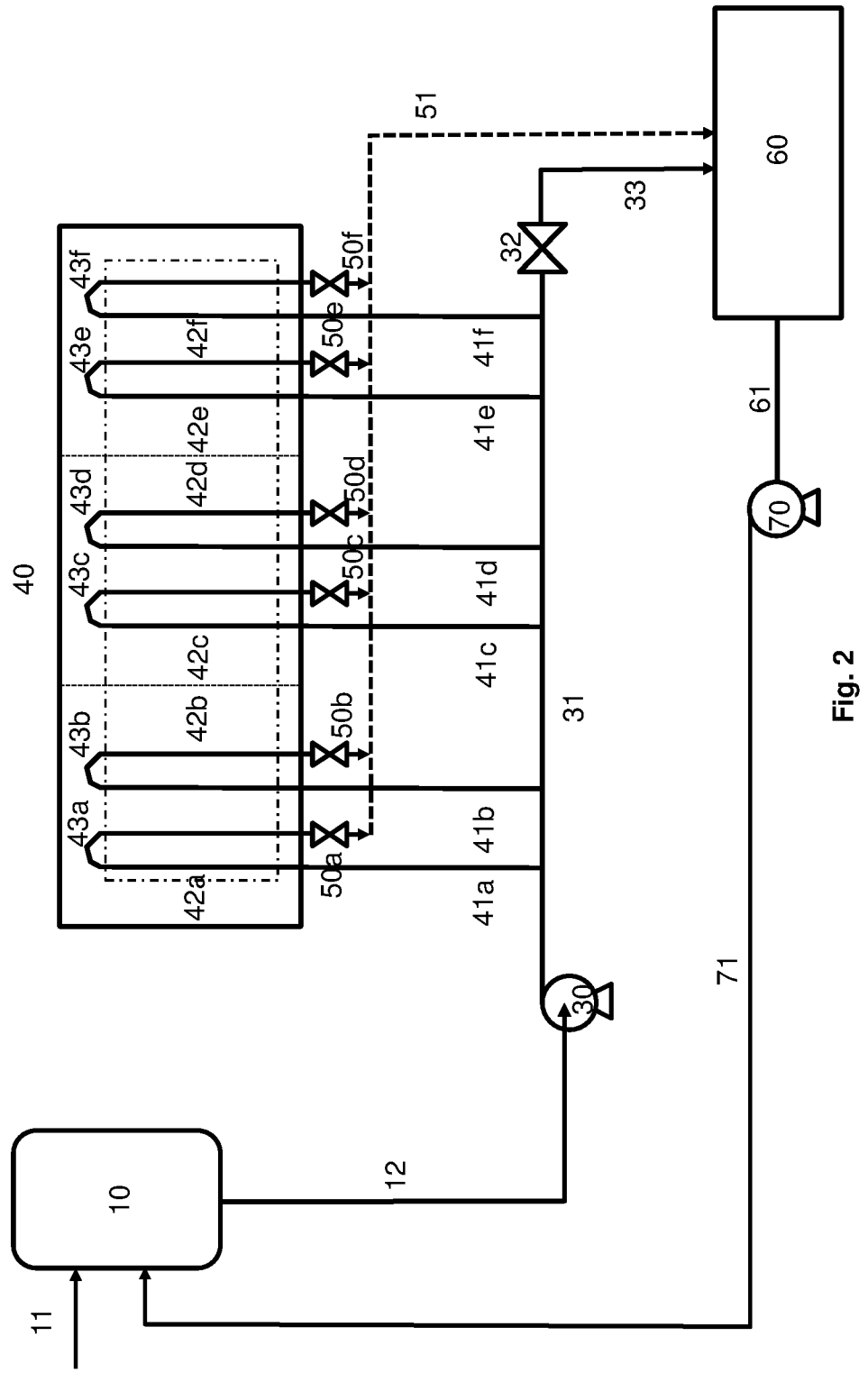
FIG. 2 shows a schematic overview of a first embodiment of a plant for the fluidized bed granulation of slurries according to the present invention.

Example 3 comprises the adaptation of the granulator feed system for urea melt from Example 1 for a UAS slurry feed. The adapted granulator feed system is shown in FIG. 2. The adaptation can be retro-fitted to an existing granulator. In FIG. 2, a feed 11 comprising an urea ammonium sulfate (UAS) slurry comprising more than 12 weight % ammonium sulfate (AS) in a urea melt is fed to the evaporation unit 10. Therein, water and other volatiles are evaporated. The remaining slurry is pumped using feed pump 30 to the main injection line 31, which branches out into the injection compartment 45, 45', 45" feed lines 41a-41f. These feed typically 90% of the UAS slurry to the injectors in the injection section 42a-42f of the fluidized bed granulator. The adaptation comprises an addition of the pit tank return line 51. At the end of each injection compartment feed line, the end caps 44a-44f from Example 1 are replaced with restriction orifices 50a-50f. These restriction orifices regulate the pressure, velocity and return fraction from each injection compartment feed line 42a-42f to the pit tank 60. The restriction orifices 50a-50f are configured to a return fraction of about 10%. The return fraction increases as the sedimentation and scaling in the lines increases. This results in a minimum velocity in the injection compartment feed line of higher than 0.5 m/s.

Compared to Example 2, due to the minimum velocity of the slurry in the lines, the risk of sedimentation and scaling in the granulator feed system, particularly the injection compartment feed lines is drastically reduced. Removal of the scaling and sedimentation can proceed more quickly by flushing the system. This improves granulator uptime. The adaptation also improves the consistency in terms of size, shape and density of the resulting UAS granules. Furthermore, the process is more stable. If individual lines partially plug, this increases the slurry pressure in the main injection line and the injection compartment lines. This results in a reduction of the amount of slurry which is injected, and a reduction in the amount of slurry which is returned.

Example 4

Figure 3:
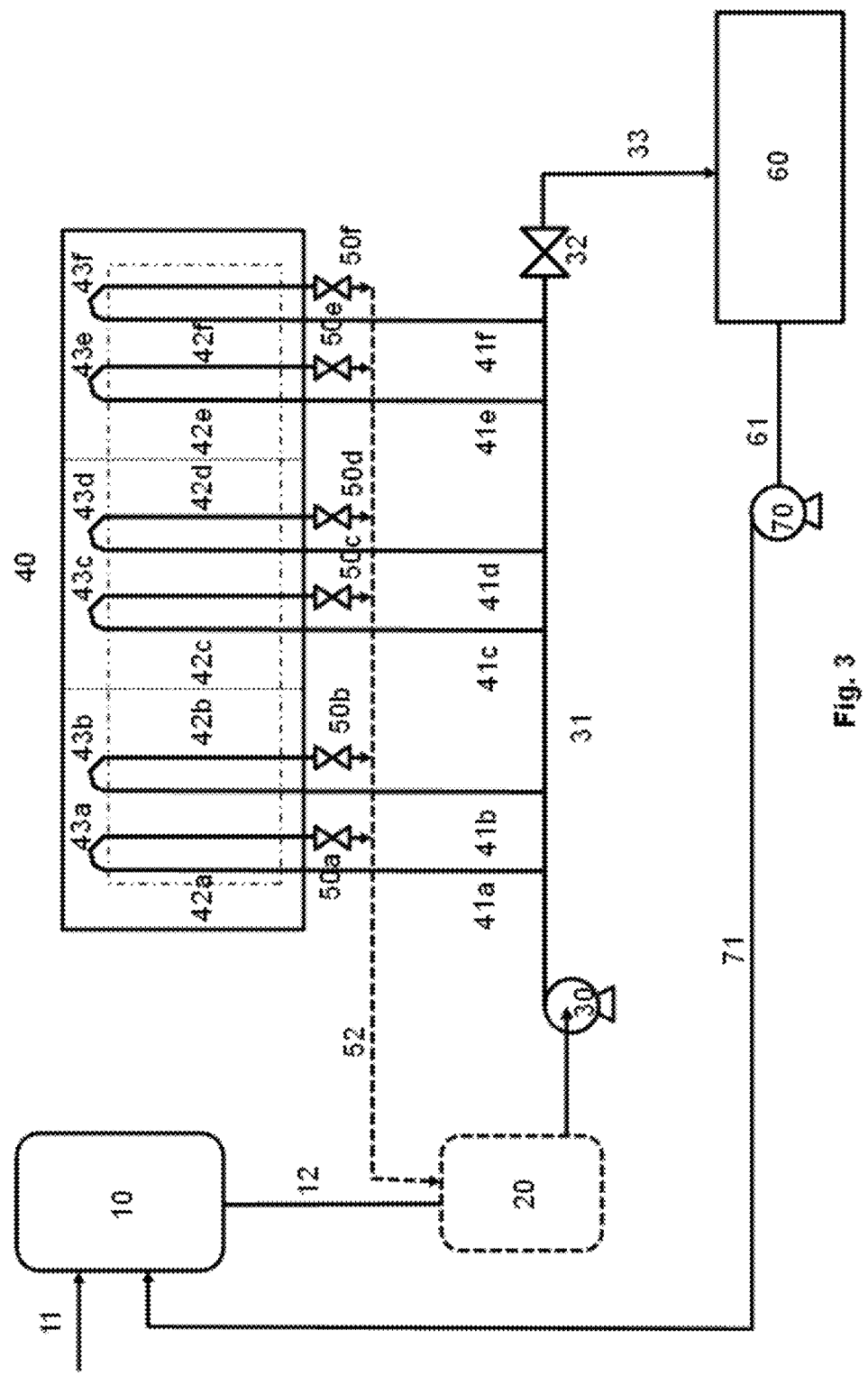
FIG. 3 shows a schematic overview of a second embodiment of a plant for the fluidized bed granulation of slurries according to the present invention.

Example 4 improves upon the previous examples by limiting the return cycle through the addition of a mixing tank. A granulator feed system for slurries comprising a mixing tank is shown in FIG. 3.

As in Examples 2 and 3, a UAS feed is fed to the evaporation unit 10 where water and volatiles evaporate. The remaining slurry is fed to a mixing tank 20. In this mixing tank, the UAS slurry from the evaporation unit 10 is mixed with the slurry from return line 52. The mixed UAS slurry is pumped to the main injection line 31, which branches out into injection compartment feed lines 41a-41f. The injection compartment feed lines 41a-41f make two passes through the injection section. The majority of the UAS slurry is injected in the injection section 42a-42f. Restriction orifice 50a-50f controls the return fraction of the UAS slurry, which is about 10%. This fraction of the UAS slurry is returned to the mixing tank 20 by mixing tank return line 52.

Compared to Example 3, the size of the return cycle is drastically reduced. The returning slurry no longer passes the pit tank 60, evaporation unit 10 and pit tank pump 70.

This reduces operational costs. Furthermore, this reduces the load and size requirements for the pit tank, pit tank pump and evaporation unit.

Example 5

Figure 4:
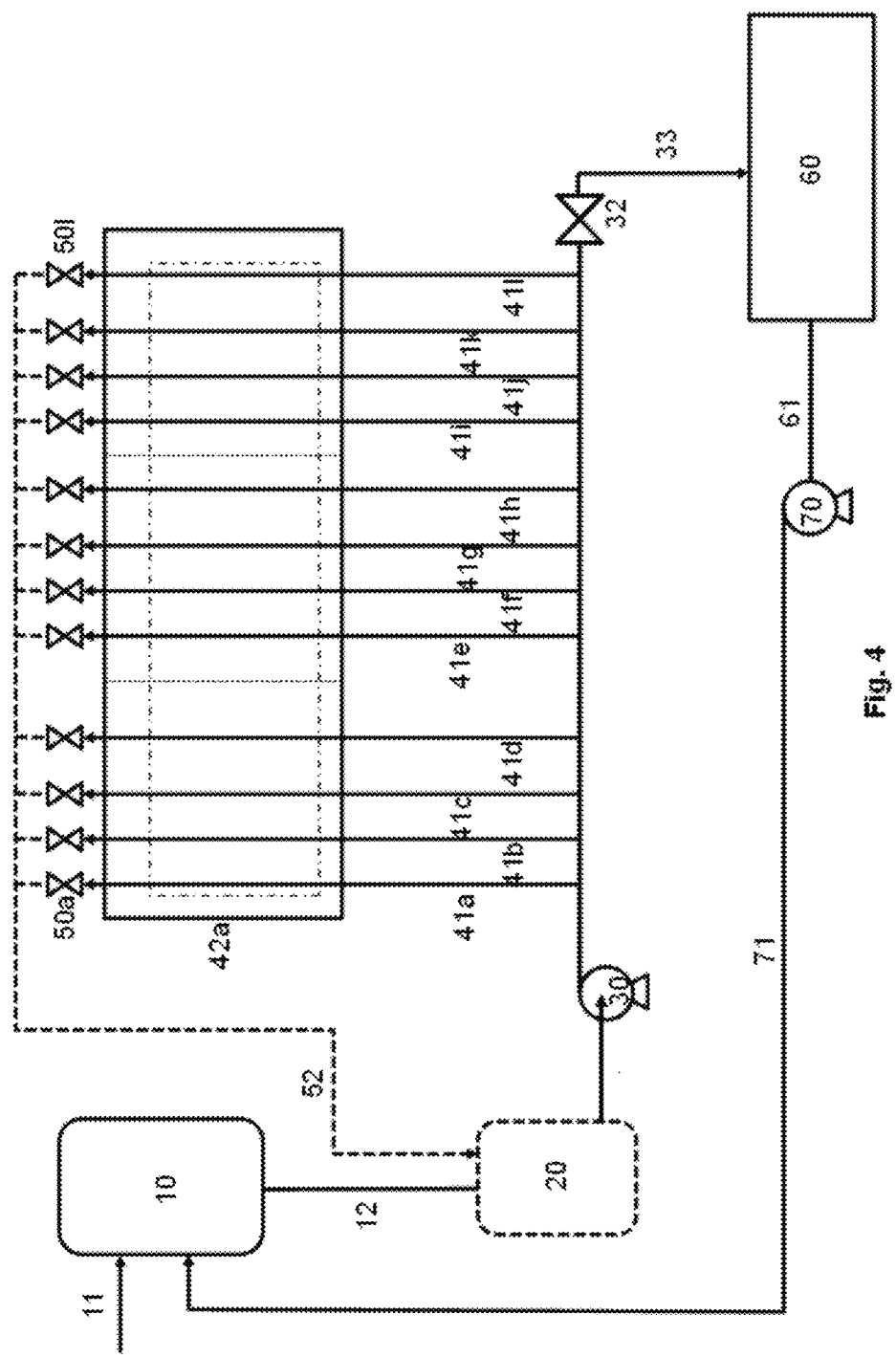
FIG. 4 shows a schematic overview of a third embodiment of a plant for the fluidized bed granulation of slurries according to the present invention.

Example 5 comprises a granulator feed system for slurries similar to Example 4, with twice the amount of injection compartment lines 41a-41l which each make a single pass through the injection section. Such a granulator feed system is shown in FIG. 4.

As in the previous Examples 2, 3 and 4, a UAS slurry is granulated. In this example, the amount of passes for each injection compartment feed line 42a-42f is reduced, and the amount of injection compartment feed lines 42a-42f is increased. The amount of injectors and the setup of the fluidized bed granulator remains the same. A return fraction of about 10% of the UAS slurry is returned to a mixing tank 20 as in Example 4.

Compared to Example 4, the mass flow in each injection compartment line is halved. The pressure drop due to sedimentation and scaling in each line drastically decreases. This reduces operational costs. The effect of sedimentation, scaling and plugging of a single line on the process stability is reduced. Furthermore, a single line plugging had a decreased impact on granule size, shape and density. This improves product consistency. Removing scale along the surface of the injection compartment feed lines is facilitated due to easier flushing of each line, lower pressure drop over each line and fewer bends which can be difficult to clean.

Example 6

Example 6 comprises the same granulator feed system as for Example 2. The fertilizer is now a slurry of a urea melt comprising elemental sulfur instead of ammonium sulfate. The process parameters are adjusted appropriately.

The fouling of the equipment for urea with elemental sulfur is less quick to build up than for UAS in Example 2. However, the fouling is still quite significant and builds up relatively fast. As elemental sulfur is a liquid, there is no sedimentation.

Example 7

Example 7 comprises the granulator feed system from Example 5, with the fertilizer slurry comprising urea with elemental sulfur from Example 6.

For a fixed operational time the fouling is significantly less than in Example 6. Furthermore, when using a maximum allowable pressure drop over the injector, the plant can remain operational significantly longer than in Example 6.

The invention claimed is:

1. A method for production of fertilizer granules by granulating a feed slurry in a fluidized bed granulator having a main longitudinal direction from a seed end where granulation is initiated, to a product discharge end where the fertilizer granules are discharged from the fluidized bed granulator, comprising at least one fluidized bed compartment, an injection section and a granulation section, separated by a bottom plate comprising one or more injection nozzles, wherein the feed slurry is provided to the injection section of the fluidized bed granulator, characterized in that a first fraction of the feed slurry provided to the injection section is injected into the granulation section through the one or more injection nozzles and a second fraction of the feed slurry, being a remainder of the feed slurry, is continuously passed through the injection section without being injected into the granulation section and is continuously returned to the injection section after it is mixed with the feed slurry, wherein the feed slurry maintains a predetermined minimum velocity within the injection section of the fluidized bed granulator.

2. The method according to claim 1, wherein the predetermined minimum velocity of the feed slurry within the injection section is at least 0.5 m/s.

3. The method according to claim 1, wherein the first fraction of the feed slurry ranges between 70% and 99% of the total feed slurry.

4. The method according to claim 1, wherein the second fraction of the feed slurry ranges between 1% and 30% of the total feed slurry.

5. The method according to claim 1, wherein the feed slurry comprises urea.

6. The method according to claim 1, wherein the feed slurry comprises one or more of the following: ammonium sulfate, calcium dihydrogen phosphate, ammonium phosphate and potassium salts.

7. The method according to claim 1, wherein the feed slurry comprises urea and, relative to the urea, more than 12 weight % of ammonium sulfate.

8. A method for reducing clogging of an injection section in a fluidized bed granulator for production of fertilizer granules, comprising at least one fluidized bed compartment having a main longitudinal direction from a seed end where granulation is initiated, to a product discharge end where granules are discharged from the fluidized bed granulator, an injection section and a granulation section, separated by a bottom plate comprising one or more injection nozzles, wherein a feed slurry is provided to the injection section of the fluidized bed granulator, characterized in that a first fraction of the feed slurry, provided to the injection section, is injected into the granulation section through the one or more injection nozzles and a second fraction of the feed slurry, being a remainder of the feed slurry, is continuously passed through the injection section without being injected into the granulation section and is continuously returned to the injection section after it is mixed with the feed slurry, wherein the feed slurry maintains a predetermined minimum velocity within the injection section of the fluidized bed granulator.

9. The method according to claim 1, wherein the predetermined minimum velocity of the feed slurry within the injection section is higher than 2.0 m/s.

10. The method according to claim 1, wherein the first fraction of the feed slurry ranges between 85% and 95% of the total feed slurry.

11. The method according to claim 1, wherein the second fraction of the feed slurry ranges between 5% and 15% of the total feed slurry.

12. The method according to claim 8, wherein the predetermined minimum velocity of the feed slurry within the injection section is at least 0.5 m/s.

13. A method for production of fertilizer granules by granulating a feed slurry in a fluidized bed granulator having a main longitudinal direction from a seed end where granulation is initiated, to a product discharge end where the fertilizer granules are discharged from the fluidized bed granulator, comprising at least one fluidized bed compartment, an injection section and a granulation section, separated by a bottom plate comprising one or more injection nozzles, wherein the feed slurry is provided to the injection section of the fluidized bed granulator, characterized in that a first fraction of the feed slurry provided to the injection section is injected into the granulation section through the one or more injection nozzles and a second fraction of the feed slurry, being a remainder of the feed slurry, is continuously passed through the injection section without being injected into the granulation section and is continuously returned to the injection section after it is mixed with the feed slurry, wherein the first fraction of the feed slurry ranges between 70% and 99% of the total feed slurry.

14. The method according to claim 13, wherein the second fraction of the feed slurry ranges between 1% and 30% of the total feed slurry.

* * * * *